United States Patent
Bergin et al.

(10) Patent No.: US 11,062,058 B2
(45) Date of Patent: Jul. 13, 2021

(54) USAGE FEEDBACK LOOP FOR ITERATIVE DESIGN SYNTHESIS

(71) Applicant: Autodesk, Inc., San Rafael, CA (US)

(72) Inventors: Michael Bergin, El Ceritto, CA (US); Mehdi Nourbakhsh, San Francisco, CA (US); Francesco Iorio, Toronto (CA); Nigel Morris, Toronto (CA); Mark Thomas Davis, Mill Valley, CA (US)

(73) Assignee: AUTODESK, INC., San Rafael, CA (US)

( * ) Notice: Subject to any disclaimer, the term of this patent is extended or adjusted under 35 U.S.C. 154(b) by 610 days.

(21) Appl. No.: 15/234,818

(22) Filed: Aug. 11, 2016

(65) Prior Publication Data

US 2018/0046732 A1    Feb. 15, 2018

(51) Int. Cl.
*G06F 30/00* (2020.01)
*G06F 30/15* (2020.01)
(Continued)

(52) U.S. Cl.
CPC .............. *G06F 30/00* (2020.01); *G06F 30/15* (2020.01); *G06F 30/17* (2020.01); *G06F 30/23* (2020.01); *G06F 2119/18* (2020.01); *Y02P 90/02* (2015.11)

(58) Field of Classification Search
CPC .. G06F 17/50; G06F 17/5086; G06F 17/5095; G06F 17/5018; G06F 2217/12; Y02P 90/265
See application file for complete search history.

(56) References Cited

U.S. PATENT DOCUMENTS

| 8,126,684 B2 * | 2/2012 | Goel | G06F 17/5095 |
| | | | 703/1 |
| 8,335,668 B2 * | 12/2012 | Taggart | G06F 17/5018 |
| | | | 703/1 |

(Continued)

OTHER PUBLICATIONS

Lehmhus, D., et al. "Cloud-Based Automated Design and Additive Manufacturing: A Usage Data-Enabled" Sensors, vol. 15, issue 12, pp. 32079-32122 (Dec. 2015) available from <https://www.ncbi.nlm.nih.gov/pmc/articles/PMC4721822/> (Year: 2015).*

(Continued)

*Primary Examiner* — Jay Hann
(74) *Attorney, Agent, or Firm* — Artegis Law Group, LLP

(57) ABSTRACT

An iterative design environment performs an iterative design process of a product by implementing usage feedback of the product when utilized under real-world conditions. Sensors are installed on the physical product and collect data about the behavior of the product under real-world conditions. The sensor data comprise usage feedback implemented to inform and produce a design problem statement and one or more design solutions. The sensor data is received by a problem statement engine to produce a problem statement based, at least in part, on the sensor data. A design engine then produces one or more design solutions for the problem statement and one of the design solutions is fabricated to produce a new physical product. Sensors are then installed onto the new physical product and the iterative design process may be performed again. The iterative design process may be performed multiple times until a satisfactory physical product is achieved.

23 Claims, 9 Drawing Sheets

(51) Int. Cl.
　　　*G06F 119/18*　　　(2020.01)
　　　*G06F 30/17*　　　(2020.01)
　　　*G06F 30/23*　　　(2020.01)

(56) References Cited

U.S. PATENT DOCUMENTS

| | | | |
|---|---|---|---|
| 8,485,051 B2* | 7/2013 | Knoop | G05B 23/0256 701/48 |
| 9,984,182 B2* | 5/2018 | Wilson | G06F 17/5009 |
| 10,303,159 B2* | 5/2019 | Czinger | B33Y 50/02 |
| 2007/0075450 A1* | 4/2007 | Belegundu | G06F 17/5018 264/40.1 |
| 2010/0274537 A1* | 10/2010 | Le | G06F 17/5018 703/1 |
| 2014/0156229 A1* | 6/2014 | Norato | G06F 17/5086 703/1 |
| 2014/0214370 A1* | 7/2014 | Olhofer | G06F 17/50 703/1 |
| 2016/0140269 A1* | 5/2016 | Wang | G06F 17/5018 703/1 |
| 2016/0171778 A1 | 6/2016 | Grossman et al. | |
| 2016/0171845 A1 | 6/2016 | Grossman et al. | |
| 2016/0171861 A1 | 6/2016 | Grossman et al. | |
| 2016/0171903 A1 | 6/2016 | Grossman et al. | |

OTHER PUBLICATIONS

Damm, P. et al. "Total hip joint prosthesis for in vivo measurement of forces and moments" Medical Engineering & Physics, vol. 32, pp. 95-100 (2010) (Year: 2010).*

Youmans, R. J., and Arciszewski, T., 2014, "Design fixation: a cloak of many colors," Design Computing and Cognition'12, Springer, pp. 115-129.

Leonard, J., 2001, "Twin-engine propeller-driven aircraft configurations," Gateway News, American Institute of Aeronautics and Astronautics, St. Louis Section.

Jansson, D. G., and Smith, S. M., 1991, "Design fixation," Design Studies, 12(1), pp. 3-11.

Chakrabarti, A., Shea, K., Stone, R., Cagan, J., Campbell, M., Hernandez, N. V., and Wood, K. L., 2011, "Computer-Based Design Synthesis Research: An Overview," Journal of Computing and Information Science in Engineering, 11(2), pp. 021003-021003.

Königseder, C., and Shea, K., 2014, "Systematic rule analysis of generative design grammars," AI EDAM, 28(Special Issue 03), pp. 227-238.

Lin, Y.-s., Shea, K, Johnson, A., Coultate, J., and Pears, J., "A method and software tool for automated gearbox synthesis," Proc. ASME 2009 International Design Engineering Technical Conferences and Computers and Information in Engineering Conference, American Society of Mechanical Engineers, pp. 111-121.

Pahl, G., and Beitz, W., 2013, Engineering design: a systematic approach, Springer Science & Business Media.

Shea, K., and Cagan, J., 1999, "Languages and semantics of grammatical discrete structures," AI EDAM, 13(04), pp. 241-251.

Falkenhainer, B., Forbus, K. D., and Gentner, D., 1989, "The structure-mapping engine: Algorithm and examples," Artificial Intelligence, 41(1), pp. 1-63.

Sridharan, P., and Campbell, M. I., 2005, "A study on the grammatical construction of function structures," AI EDAM, 19(03), pp. 139-160.

Wang, M. Y., Wang, X., and Guo, D., 2003, "A level set method for structural topology optimization," Computer Methods in Applied Mechanics and Engineering, 192(1-2), pp. 227-246.

Allaire, G., Jouve, F., and Toader, A.-M., 2004, "Structural Optimization by the Level-Set Method," Free Boundary Problems: Theory and Applications, P. Colli, C. Verdi, and A. Visintin, eds., Birkhäuser Basel, Basel, pp. 1-15.

Flager, F., Soremekun, G., Adya, A., Shea, K., Haymaker, J., and Fischer, M., 2014, "Fully Constrained Design: A general and scalable method for discrete member sizing optimization of steel truss structures," Computers & Structures, 140(0), pp. 55-65.

* cited by examiner

USAGE FEEDBACK LOOP FOR ITERATIVE DESIGN SYNTHESIS

BACKGROUND OF THE INVENTION

Field of the Invention

Embodiments of the present invention relate generally to computer science and, more specifically, to a usage feedback loop for iterative design synthesis.

Description of the Related Art

A design problem statement may define the requirements of a design solution for a product. Designers use computer-aided design (CAD) systems to assist in developing design solutions to the design problem statement. Among other things, CAD systems provide complex functions to support design modeling and produce different design solutions that satisfy the requirements of the design problem statement. Accordingly, designers are able to explore a design solution space having alternative design solutions and analyze various performance trade-offs with each design solution. In this regard, design synthesis methods have been developed to assist designers in rapidly generating and exploring a design solution space. Design synthesis methods may generate a vast number of design solutions, where each satisfies a design problem statement using high-performance computing in an efficient manner.

One drawback with conventional design synthesis methods is that, limited feedback is provided with respect to the actual performance of fabricated products to direct further design iterations of those products. What limited feedback is provided typically consists of qualitative feedback that is based on the experience and intuition of the designers themselves. Thus, conventional feedback used to drive the next design iteration of the product is typically of limited value and use.

As the foregoing illustrates, there is a need in the art for more effective techniques for iterative design synthesis.

SUMMARY OF THE INVENTION

Various embodiments of the invention includes a computer-implemented method for designing a product. The method includes receiving first sensor data comprising data recorded by at least one sensor on a first product when utilized in at least one real-world usage condition. The method also includes producing a first design problem statement based, at least in part, on the first sensor data. The method further includes producing at least one design solution based on the first design problem statement.

At least one advantage of the disclosed technique is that quantitative usage feedback collected from real-world use of a product are incorporated into a design process for the product.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
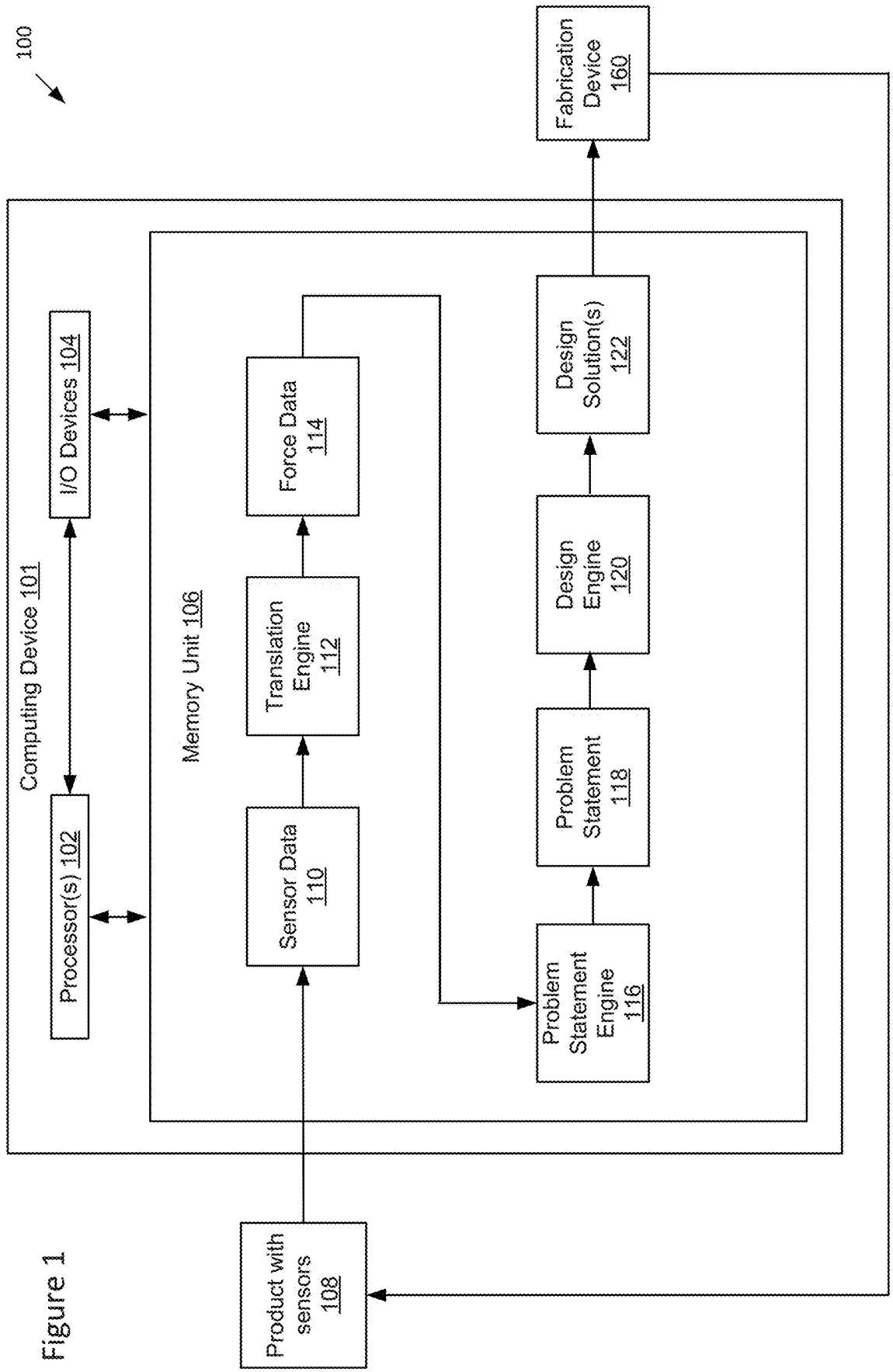
FIG. 1 illustrates an iterative design environment configured to implement one or more aspects of the present invention.

FIG. 1 illustrates an iterative design environment 100 configured to implement one or more aspects of the present invention. The iterative design environment 100 comprises an environment for performing an iterative design process implementing real-world usage feedback. As shown, the iterative design environment 100 includes a computing device 101 connected to a physical product with installed sensors 108 and a fabrication device 160.

The computing device 101 may comprise at least one processor 102 coupled to input/output (I/O) devices 104 and to a memory unit 106. The computing device 101 may comprise a server, personal computer, laptop or tablet computer, mobile computing device, or any other device suitable for practicing various embodiments described herein.

In general, a processor 102 may be any technically feasible processing device or hardware unit capable of processing data and executing software applications and program code. The processor 102 executes the software and performs the functions and operations set forth in the embodiments described herein. For example, a processor 112 may comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 106 may include a hard disk, a random access memory (RAM) module, a flash memory unit, or any other type of memory unit or combination thereof. Processor 102 and I/O devices are configured to read data from and write data to memory 106. The memory unit 106 is configured to store software application(s) and data. Instructions from the software constructs within the memory unit 106 are executed by processors 102 to enable the inventive operations and functions described herein. In various embodiments, the memory unit 106 is configured to store sensor data 110, a translation engine 112, force data 114, a design problem statement engine 116, a design problem statement 118, a design engine 120, and one or more design solutions 122. The processor 102 is configured to execute the translation engine 112, design problem statement engine 116, and design engine 120 to provide an underlying functionality of a iterative design environment as described in various embodiments herein.

I/O devices 104 are also coupled to memory 106 and may include devices capable of receiving input, such as a keyboard, a mouse, a trackball, and so forth, as well as devices capable of providing output, such as a display monitor, speaker, and so forth. The display monitor may display visual feedback to the user to assist in the design and modeling of the product. Additionally, I/O devices may include devices capable of both receiving input and providing output, such as a touchscreen, a universal serial bus (USB) port, and so forth. I/O devices 104 may be configured to receive various types of input from an end-user of the design environment 100, and to also provide various types of output to the end-user of design environment 100. In particular, the I/O devices may further include a fabrication device 160.

A fabrication device 160 may comprise any device capable of fabricating/producing a physical product based on a design solution 122. For example, the fabrication device 160 may comprise a 3D printer, fuse-deposition modeling (FDM) printer, stereolithography (SLA) printer, metal-based 3D printers (such as a selective laser sintering printer), laser cutter, router, or any CNC machine capable of producing physical 3D products using one or more different materials. For example, materials used to print products may include metals, ABS plastic, polylactic acid (PLA) plastic, resin, nylon, rubber, or any other suitable material. The fabrication device 160 may implement a variety of additive manufacturing technologies (such as additive layer manufacturing) to create a 3D product by building it in successive layers until the product is complete.

In some embodiments, the iterative design process may begin with an initial physical product. The initial product may comprise a previously fabricated product, such as a product produced from an older design. The product may comprise any item or article that may be digitally designed and manufactured. In some embodiments, the product comprises a product to be used to support specified loads. Several fabrication spaces may specifically benefit from digital design of products supporting a load, such as products used in automobile, ship, and aircraft industries. In the embodiments described below, the product comprises a car chassis that is iteratively designed by implementing usage feedback. In other embodiments, any type of product may be designed in accordance with various embodiments described herein.

One or more sensors are mounted/installed onto the initial physical product to form a physical product having installed sensors 108 (referred to as a product with sensors 108). For a product comprising a car chassis, the remaining components of the car would then also be installed onto the chassis to produce a drivable and operational car. The physical product with installed sensors 108 may then be utilized in a real-world environment under various usage conditions that are typical or atypical (extreme) for the product. For example, for a car chassis, the operational car is driven under several different conditions/maneuvers. Various types of data may be aggregated/collected by the sensors while the product is utilized in the real-world environment.

The aggregated/collected sensor data 110 may then be loaded from the storage device 220 and stored to the memory 106 of the computing device 101. The collected sensor data 110 may comprise different types of non-force-based data, such as acceleration data, temperature data, etc. However, the problem statement engine 116 may be configured to receive force information (as input) to produce a problem statement 118 (as an output). Therefore, a translation engine 112 may be employed to translate the collected sensor data 110 to force data 114. The problem statement engine 116 receives the force data 114 to produce a problem statement 118 based, at least in part, on the force data 114. Note that since the force data 114 is derived from the sensor data 110, the problem statement engine 116 in effect produces a problem statement 118 based, at least in part, on the collected sensor data 110.

In general, a design problem statement may comprise a high-level engineering problem defined as a set of design requirements and a definition of a design space that each design solution for a product must satisfy. The design engine 120 may receive the design problem statement 118 for a product and produce at least one design solution that meets all design requirements of the problem statement 118. Typically, the design engine 120 produces a plurality of design solutions 122 to a design problem statement 118 for a product, each design solution 122 comprising a 3D model of the product that is a 3D printable design. One design solution 122 may be selected for fabrication/manufacture and the design engine 120 may export the selected design solution 122 to the fabrication device 160, which then produces a new physical product based on the selected design solution 122.

Sensors may then be mounted/installed onto the new physical product to form a new physical product with sensors 108 and the iterative design process may be performed again. The iterative design process may be performed multiple times until a satisfactory physical product is achieved. As described above, the iterative design process may begin with an initial physical product comprising a previously fabricated product. In other embodiments, however, the iterative design process may begin at the formation of the design problem statement 118. In these embodiments, the problem statement engine 116 may receive force information from a designer, rather than the translation engine 112. Such force information would not be based on sensor data 110, but rather be based on intuition and previous experience of the designer, and may comprise a "best guess" of the force information. The problem statement engine 116 may then produce a design problem statement 118 based on the received force information from the designer to start the iterative design process.

As described above, the iterative design environment 100 performs an iterative design process of a product by implementing usage feedback of the product when utilized in a real-world environment. The iterative design environment 100 enables a physical product 108 to be instrumented with sensors that collect data about the behavior of the product under real-world usage conditions. The data 110 collected by the sensors (usage feedback) comprise recorded real-world quantitative data that is implemented to inform and produce a design problem statement 118 and one or more design solutions 122. In particular, the sensor data 110 (usage feedback) is received by the problem statement engine 116 (after a translation process) to produce a problem statement 118 based, at least in part, on the sensor data 110. The design engine 120 then produces one or more design solutions 122 for the problem statement 118 and one of the design solutions 122 is fabricated to produce a new physical product. The iterative design process may be performed multiple times until a satisfactory physical product is achieved.

Figure 2:
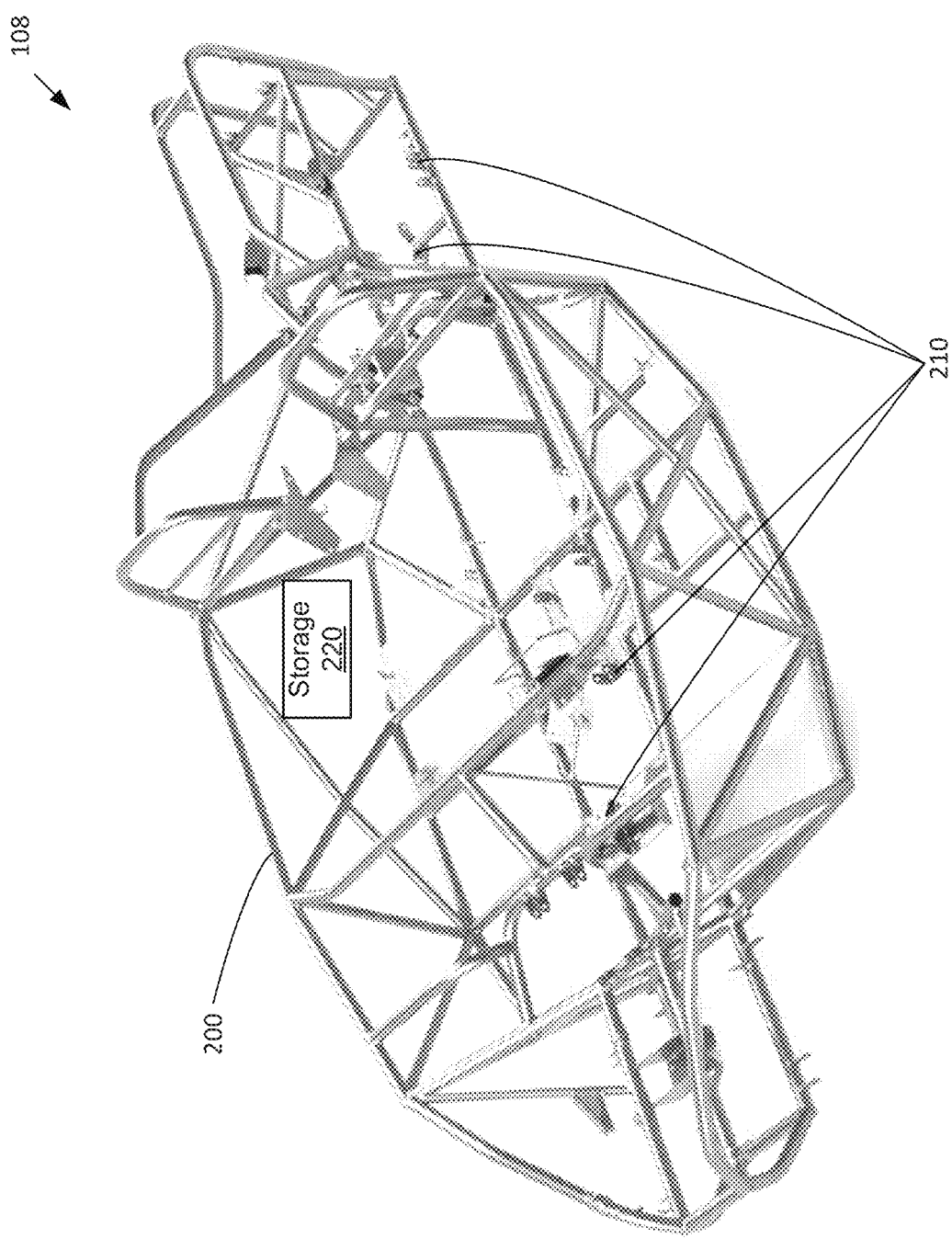
FIG. 2 is an illustration of an initial product with multiple sensors, according to various embodiments of the present invention.

FIG. 2 is an illustration of an initial product with sensors 108, according to various embodiments of the present invention. The product with sensors 108 comprises an initial physical product 200 and a plurality of mounted sensors 210. For example, the initial product 200 may comprise a previously fabricated product produced from an older design that is utilized as a starting point for the iterative design process. In the example of FIG. 2, the product 200 comprises a car chassis. In other embodiments, the product 200 may comprise any other item or article that may be digitally designed and manufactured.

As shown in FIG. 2, one or more sensors 210 are mounted/installed onto the initial physical product 200. The sensors 210 may be placed at one or more specific locations on the product 200 where data is collected. For example, for a car chassis, a sensor 210 may be placed at each interface location (referred to as a port) where the chassis connects to another part of the car (referred to as an external part/component), such as seats, suspension components, engine, transmission, steering components, etc. The port locations may define boundary locations of the product 200 where the product 200 contacts other parts (external parts). Thus, the port locations may comprise locations where boundary constraints exist due to mechanical contact with an external part. However, sensors 210 may be placed at other non-port locations on the product 200 as well to provide sufficient sensor coverage on the product 200 for ample data collection at the sensor locations. For the car chassis, the remaining parts/components of the car (e.g., suspension, engine, transmission, etc.) would then also be installed onto the chassis to produce a drivable and operational car.

In some embodiments, the sensors 210 installed on the product 200 comprise sensors of one or more different types and record/collect one or more different types of data. The types of sensors 210 may be selected based on the particular type of product 200 on which the sensors 210 are installed and comprise types of sensors 210 that are appropriate for the type of product 200. For example, for a car chassis, the sensors 210 may include an accelerometer (for recording acceleration data), speed sensor (for recording speed data), a temperature sensor (for recording temperature data), vibration sensor (for recording vibration data), and the like. Other examples of sensors that may be installed on the product 200 include acoustic sensors, ultrasonic sensors, strain sensors, fatigue sensors, moisture sensors, velocity sensors, and the like. In other embodiments, other types of sensors may be installed on the product 200 to record/collect other types of data.

Further, each sensor 210 may record static data and/or dynamic data. For recording static data, each sensor 210 may record one or more different types of values, such as a maximum value, minimum value, and average value. For recording dynamic data comprising time series data, each sensor 210 may record data values over time, each data value having an associated timestamp. Each sensor 210 may be coupled (e.g., via wired or wireless connection) to a storage device 220. For example, the storage device 220 may comprise a hard disk or solid-state device, or any other type of device configured for receiving and storing data. The storage device 220 may be mounted anywhere on the product 200 (e.g., chassis) or the completed product (e.g., operational car). The storage device 220 may be configured to receive and store the sensor data 110 from each sensor 210. In other embodiments, the sensors 210 and/or storage device 220 may also each be coupled to a wireless router (not shown) for transmitting collected data to a server or the computing device 101.

The physical product with sensors 108 may then be utilized in a real-world environment under usage conditions that are typical or atypical (extreme) for the product. The usage conditions may comprise a set of controlled design trials to capture the performance and behavior characteristics of the product in real-world situations. For a product 200 comprising a car chassis, the operational car is utilized in a real-world environment and driven under several different conditions. For example, each condition may comprise a specific driving maneuver, such as maximum acceleration, maximum deceleration, left turn, right turn, impact from obstacle, car at rest, etc. Each condition/maneuver defines a specific "load case" for the product 200. The various sensors 210 record and collect the various types of data while the physical product 200 is utilized in the real-world environment under the different usage conditions (load cases).

The collected sensor data 110 may then be loaded from the storage device 220 and stored to the memory 106 of the computing device 101 for processing. As discussed above, the collected sensor data 110 may comprise different types of non-force-based data, such as acceleration data, temperature data, etc. However, the problem statement engine 116 may be configured to receive force information (as input) to produce a problem statement 118 (as an output). Therefore, a translation engine 112 may be employed to translate the collected sensor data 110 to force data 114. The translation engine 112 may implement any commercial software package configured for data analysis and data translation (e.g., Microsoft® Excel®, National Instruments LabVIEW®, MathWorks MATLAB®, Autodesk® Fusion Connect®, and the like).

In other embodiments, the problem statement engine 116 may be compatible with and receive as input another type of data (other than force data). In these embodiments, the translation engine 112 may translate the collected sensor data 110 to the other type of data that is compatible with the problem statement engine 116. In further embodiments, the problem statement engine 116 may be compatible with and receive as input the sensor data 110 without the need for data translation.

The force data 114 represents various real-world forces or loads (such as tension, compression, shear, etc.) being applied to the product 200 under the real-world usage conditions. For example, the force data 114 may comprise tension data, compression data, shear data, load data, or any other force-based data, or any combination thereof. As described above, the sensor data 110 may comprise static data and/or dynamic data. Thus, the resulting force data 114 may also comprise static force data and/or dynamic force data. As loads (forces) can cause stresses, deformations, and displacements in the structure of the product 200, excess loads/forces may cause structural failure of the product. Thus, assessment of the effects of loads/forces on the product 200 should be considered in the design of the product 200.

Figure 3:
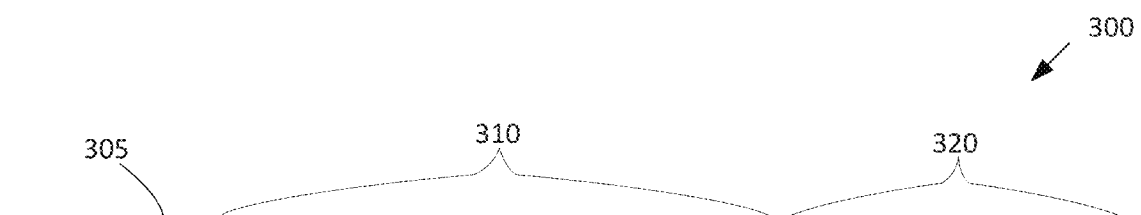
FIG. 3 is a conceptual diagram of a force data table, according to various embodiments of the present invention.

In some embodiments, the translation engine 112 organizes and stores the force data 114 as a plurality of force data tables. FIG. 3 shows a conceptual diagram of a force data table 300, according to various embodiments of the present invention. Each force data table 300 may store force data for a specific real-world usage condition ("load case"). For example, for a product 200 comprising a car chassis, each force data table 300 may store force data for a specific real-world driving maneuver. Thus, the exemplary force data table 300 shown in FIG. 3 may represent force data for a specific maneuver (load case), such as maximum acceleration.

As shown, the force data table 300 comprises a plurality of entries 301 (such as 301*a*, 301*b*, 301*c*, etc.), each entry 301 representing a specific sensor 210 installed on the product 200 and the force data associated with the specific sensor 210. In particular, each entry 301 represents force data derived from sensor data recorded by the specific sensor 210 during the specific maneuver (load case). Each entry 301 comprises a plurality of fields, including a sensor number field 305, location fields 310, and force data fields 320. The sensor number field 305 comprises a unique identifier for the particular sensor that is represented by the entry 301. The location fields 310 may specify the installation location of the sensor 210 on the product 200. For example, the location fields 310 may specify "front/back of car," "upper/lower A-frame," and "front/back bar of A-frame." The force data fields 320 may specify force data values associated with the sensor at the specified installation location during the specific maneuver (load case). For example, the force data fields 320 may specify the magnitude and direction (+/−) of maximum force ("maximum load (kN)") and minimum force ("minimum load (kN)") detected at the sensor location.

To illustrate, a first entry 301*a* may represent a first sensor, a second entry 301*b* may represent a second sensor, a third entry 301*c* may represent a third sensor installed on the product 200, and so forth. The first entry 301*a* specifies that a maximum load of −40.2 kN and a minimum load of −33.6 kN were detected at the first sensor location, the second entry 301*b* specifies that a maximum load of −22.8 kN and a minimum load of −8.8 kN were detected at the second sensor location, the third entry 301*c* specifies that a maximum load of −76.8 kN and a minimum load of −47.2 kN were detected at the third sensor location, and so forth.

Note that in the example of FIG. 3, the force data table 300 comprises load data values. In other embodiments, however, the force data table 300 may comprise other force-based data values, such as tension data values, compression data values, shear data values, and the like. Also note that in the example of FIG. 3, the force data table 300 organizes and stores static force data (maximum and minimum load values). In other embodiments, however, the force data table 300 may organize and store dynamic force data.

The problem statement engine 116 receives, from the translation engine 112, the force data 114 as input. The problem statement engine 116 then produces a design problem statement 118 based, at least in part, on the force data 114. Note that since the force data 114 is derived from the sensor data 110, the problem statement engine 116 in effect produces a problem statement 118 based, at least in part, on the collected sensor data 110. In general, a design problem statement 118 may comprise a high-level engineering problem defined as a set of design requirements and a definition of a design space that each design solution for a product must satisfy. The set of design requirements may be considered a set of mechanical requirements that are expressed in terms of mechanical or functional requirements for the design solutions. The set of design requirements may comprise different types of design requirements, each type of requirement describing a different aspect of the design solution. For example, the set of design requirements may include one or more goals and/or one or more constraints. In other embodiments, the design problem statement 118 may include other types of design requirements.

A goal requirement may specify a property in the design solution to be maximized or minimized. Thus, a goal requirement may specify optimizations for the design solution and include measurable criteria for evaluating the effectiveness of the design solution (how well the design solution solves the design problem). For example, a goal requirement may specify a minimum weight and volume for a product, while still satisfying the other design requirements (such as constraints).

A constraint requirement may specify a value of a property of the design solution that the design solution must satisfy. Thus, a constraint requirement sets a quantifiable value of a property that the design solution must meet. For example, a constraint requirement may specify that "the chassis beam diameter cannot be wider than 3 cm." In some embodiments, the design problem statement 118 includes at least constraint requirement that specifies at least one force value that the design solution of the product must satisfy. In general, the constraint requirements may define forces that the design solution/product must tolerate in a real-world environment.

In these embodiments, the problem statement engine 116 produces a problem statement 118 that includes at least one constraint associated with at least one sensor 210. In particular, the problem statement 118 includes at least one constraint based, at least in part, on the force data 114 associated with at least one sensor 210 (installed on at least one location on the product 200). Since the force data 114 is derived from the sensor data 110, the problem statement engine 116 in effect produces at least one constraint based, at least in part, on the sensor data 110 collected by the at least one sensor 210. Thus, the constraints of the problem statement 118 are produced and derived from real-world quantitative data (usage feedback) and is based on realistic information, rather than the intuition or personal experience of the designer. The problem statement 118 derived from real-world quantitative data (usage feedback) is then utilized to drive further design solutions.

The force data 114 associated with the sensors 210 may be utilized to define a plurality of constraints in the problem statement 118, each constraint being associated with the force data 114 associated with a particular sensor 210. For example, referring back to the table 300 of FIG. 3, a first constraint may be based on a first entry 301*a* representing a first sensor 210, a second constraint may be based on a second entry 301*b* representing a second sensor 210, a third constraint may be based on a third entry 301*c* representing a third sensor 210, and so forth. The first constraint may specify that the design solution/product must tolerate a maximum load of −40.2 kN and a minimum load of −33.6 kN at the first sensor location, the second constraint may specify that the design solution/product must tolerate a maximum load of −22.8 kN and a minimum load of −8.8 kN at the second sensor location, the third constraint may specify that the design solution/product must tolerate a maximum load of −76.8 kN and a minimum load of −47.2 kN at the third sensor location, and so forth. A constraint that is based on a sensor 210 located at a port location may be referred to as a boundary constraint. Since a port location defines a boundary location of the product 200 where the product 200 contacts an external part, the port location comprises a location where a boundary constraint exist due to mechanical contact with the external part. However, as noted above, sensors 210 may be placed at non-port locations on the product 200 as well.

As described above, the force data 114 may be organized and stored as a plurality of force data tables 300, each force data table 300 comprising force data for a specific usage condition (load case), such as a specific driving maneuver. Further, the problem statement engine 116 may produce a separate constraint for each entry 301 (representing each sensor 210) of each force data table 300. Thus, the resulting problem statement 118 may include a vast number of separate constraints based on the force data 114. Each design solution of the product must simultaneously satisfy/meet each of the separate constraints specified in the problem statement 118. For example, a goal requirement of the problem statement 118 may specify a minimum weight and volume for the design solution/product that can still satisfy all the constraints.

To produce the constraints of the problem statement 118, the problem statement engine 116 also determines the mount locations and mount geometries for the sensors 210. The mount location for a sensor 210 is the location where the sensor 210 is mounted/installed on the product 200. The mount geometry of a sensor 210 comprises a product geometry of the location where the sensor 210 is mounted/installed on the product 200. A mount location and mount geometry of a sensor 210 located at a port location of the product 200 may be referred to as a port location and port geometry. For example, for a car chassis, the port geometry of a sensor 210 may comprise the geometry of a port interface where the chassis connects to an external part.

For example, the problem statement engine 116 may determine the mount locations and mount geometries for the sensors 210 installed on the product 200 by performing a 3D laser geometry scan of the product 200 to produce a 3D scan of the product 200, which includes 3D scans of the mounting locations of the sensors 210. The problem statement engine 116 may then import the 3D scan to a mesh processing tool to subdivide the 3D scan of the product 200 to extract a collection of 3D mesh geometries comprising 3D mesh geometries of all the sensor mounting locations on the product 200. The mesh processing tool may comprise a software application for converting captured reality input (such as 3D scans) into 3D meshes that can be edited, manipulated, and modified. Examples of the mesh processing tool include Autodesk® ReMake® and Autodesk® Memento®.

Figure 4:
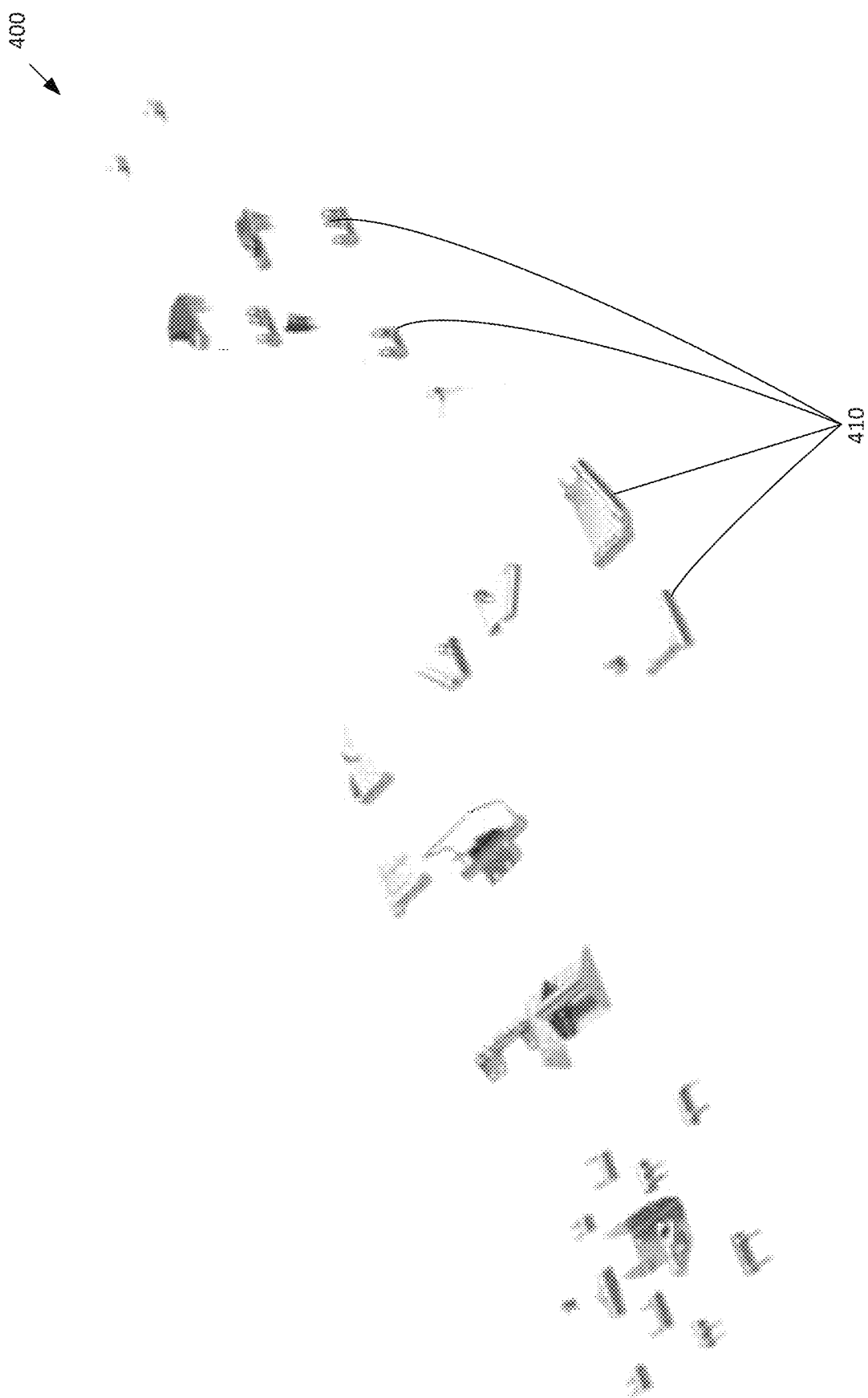
FIG. 4 is an illustration of a collection of 3D mesh geometries produced for the initial product of FIG. 2, according to various embodiments of the present invention.

FIG. 4 is an illustration of a collection of 3D mesh geometries produced for the initial product of FIG. 2, according to various embodiments of the present invention. In the examples of FIG. 2 and FIG. 4, the product 200 comprises a car chassis. In other embodiments, the product 200 may comprise any other item or article that may be digitally designed and manufactured. As shown in FIG. 4, the collection of 3D mesh geometries 400 includes a 3D mesh geometry 410 of each sensor mounting location on the car chassis.

The mount locations and mount geometries for all sensors 210 installed on the product 200 may then be determined via the collection of 3D mesh geometries. The problem statement engine 116 may then map the mount locations for the sensors 210 in the collection of 3D mesh geometries to the appropriate force data 114 in each force data table 300. For example, the problem statement engine 116 may match the location fields 310 in each entry 301 of the force data table 300 to a mount location in the collection of 3D mesh geometries to determine an entry 301 corresponding to the mount location. The entry 301 corresponding to a mount location includes force data fields 320 comprising force data 114 that corresponds to the mount location. Each constraint may thereby specify the mount location and the force data 114 corresponding to the mount location.

Figure 5:
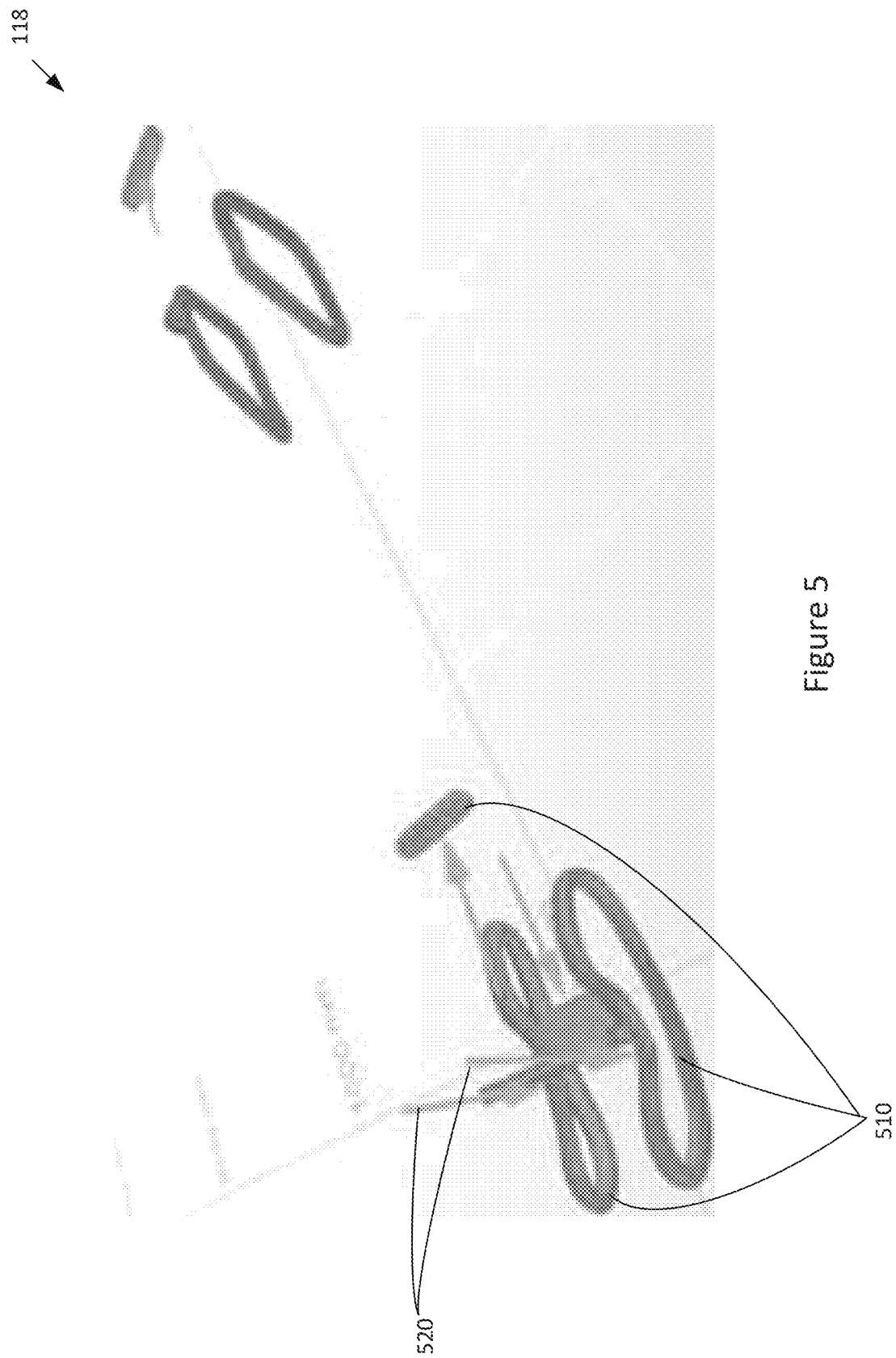
FIG. 5 is a conceptual diagram of a portion of the problem statement generated from the collection of 3D mesh geometries of FIG. 4, according to various embodiments of the present invention.

FIG. 5 shows a conceptual diagram of a portion of the problem statement 118 generated from the collection of 3D mesh geometries 400 of FIG. 4, according to various embodiments of the present invention. In the example of FIG. 5, in order to accelerate the design synthesis, several mount locations and geometries were grouped and simplified in an enveloping mount location and geometry 510 modeled to encompass several mount locations and geometries simultaneously. Force data 114 corresponding to each enveloping mount location and geometry 510 is represented by a force vector arrow 520 having a direction and magnitude (represented by the length of the vector arrow).

As mentioned above, the design problem statement 118 also includes a definition of the design space for the product. The definition of the design space may specify a 3D space or volume that comprises the entirety of locations where the design solution for the product is permitted to occupy. In some embodiments, the problem statement engine 116 helps define the design space by defining obstacle regions that represent a geometric domain in the design space that are prohibited from being occupied by the design solution. For example, the problem statement engine 116 may define obstacle regions by performing a 3D laser geometry scan of the completed product to produce a 3D scan of the completed product. For example, the completed product may comprise a complete operational car comprising the chassis and all other external components (e.g., engine, transmission, suspension, etc.). The problem statement engine 116 may then import the 3D scan to a mesh processing tool to define obstacle regions using 3D meshes of the scanned external components (e.g., scanned meshes of the engine, transmission, suspension).

The design engine 120 may receive the design problem statement 118 for a product and produce at least one design solution that meets all the design requirements (including all constraints) of the problem statement 118. The design engine 120 may also comprise various applications and engines (such as a rendering application/engine, computer-aided design (CAD) application, computer-aided engineering (CAE) application, simulator application, modeler application, geometry generator application, or the like) to perform the functions and operations described herein. The design engine 120 may implement various design synthesis algorithms to produce the design solutions. In the embodiments described below, the design synthesis algorithm comprises a combination of a topology optimization algorithm and a beam-based optimization algorithm. In other embodiments, however, the design synthesis algorithm comprises another type of design synthesis algorithm (such as Lattice Optimization, Skin Optimization, Composite Layer Optimization, Free Shape Optimization, Parametric Design Optimization, and the like).

In general, designing products based on structural analysis have become particularly popular. Structural analysis typically involves implementing one or more topology optimization algorithms to produce optimized designs based on structural performance of the designs. Topology optimization typically includes processing an initial 3D model of an product that represents a maximum volume of the product in terms of the amount of material needed to manufacture the product. During such operations, volume/material is removed from or added to the 3D model based on a structural analysis of the 3D model. More specifically, a simulation of the flow of forces through the maximum volume is produced, and based on how the forces are distributed throughout the maximum volume, the topology optimization algorithm progressively removes volume/material from areas of the maximum volume having the least amount of stress, while also adding volume/material to areas of the maximum volume having greater amounts of stress. Topology optimization may be implemented via finite element analysis (FEA) algorithms to create accurate simulations of how forces are distributed throughout a volume and of the resulting deformations and stresses present within the volume. In this fashion, topology optimization may be used to generate optimized designs that have as little volume/material as possible while maintaining a level of structural integrity that satisfies the design problem statement 118. In general, beam-based optimization generates a beam network for a product comprising a plurality of nodes that are interconnected by a plurality of lines (beams). The beam network may comprise a 3D space.

The design synthesis algorithm may comprise a combination of topology optimization and beam-based optimization algorithms that synthesize various design solution geometries based on a combination of a volume constant and a number of iterations in the topology optimization, with density and a degree of connectivity in the beam-based optimization. The parameters for utilizing the combination of topology and beam-based optimization that define the design solution space may comprise $\mu, n, \varepsilon, \eta$ where $\mu$ is the topology optimization volume constant that determines the 'thickness' of the solutions, n is the number of topology optimization iterations, $\varepsilon$ is the density of the beam nodes, and $\eta$ is the degree of connectivity of the beam nodes. The combined overall algorithm may be outlined as: 1) initialize design space volume $\Omega$ with convex hull; and 2) generate solution space by a) iteratively topology optimize by: i) computing strain energy density using FEA solver; and ii) advect volume according to shape derivative; b) initialize beam network by; i) sampling beam nodes within volume; and ii) connect nodes to form beams and discarding invalid beams; and c) finalize beam network by optimizing beam network thicknesses.

To begin the optimization, an initial volume $\Omega$ is generated by computing a coarse convex hull that included all of the constraints and excluded obstacle regions. The volume is then used as input to the topology optimization. A level-set method may be applied since the level-set method does not suffer from 'checkerboarding' artifacts of Solid Isotropic Material with Penalization (SIMP)-based methods and is a more physical representation of the volume boundary as there are no partial density voxels as in SIMP-based methods. A voxel-based FEA method may be used evaluate the compliance of the body along with a volume penalty term scaled by the volume constant $\mu$, as expressed by equation (1) below:

$$J(\Omega):=\int_\Omega Ae(u_\Omega):e(u_\Omega)dx+\mu Vol(\Omega) \quad (1)$$

In equation (1), A is the elasticity tensor and $e(u_\Omega)$ is the linearized strain tensor of the displacement $u_\Omega$. From this, a shape derivative is obtained to advect the level-set such that a move in a descent direction is made at each iteration and are thus able to minimize $J(\Omega)$. The value of $\mu$ is chosen to be relatively small since the output volume was to be utilized as a seed for the next stage and a 'thicker' volume was preferable. After running topology optimization for n iterations, the output volume is used to seed the synthesis of a light-weight beam network.

The positions of nodes within the volume are determined using pseudo-random volumetric sampling with the specified density $\varepsilon$ and then connected the nodes to their nearest $\eta$ neighbors to form the initial beam network. Invalid connections are then pruned such that no beam crossed existing geometry or boundary constraint. The boundary constraint geometries are kept as surfaces and additional beams are used to connect these surfaces to the rest of the network. The beam thicknesses are then iteratively optimized using a gradient-free, fully constrained design method (for discrete member sizing optimization of truss structure) while ensuring that no member's stress exceeded the yield stress safety factor. During optimization any beam elements' thicknesses that drop below printable limits are thus discarded from the final design solution.

Figure 6:
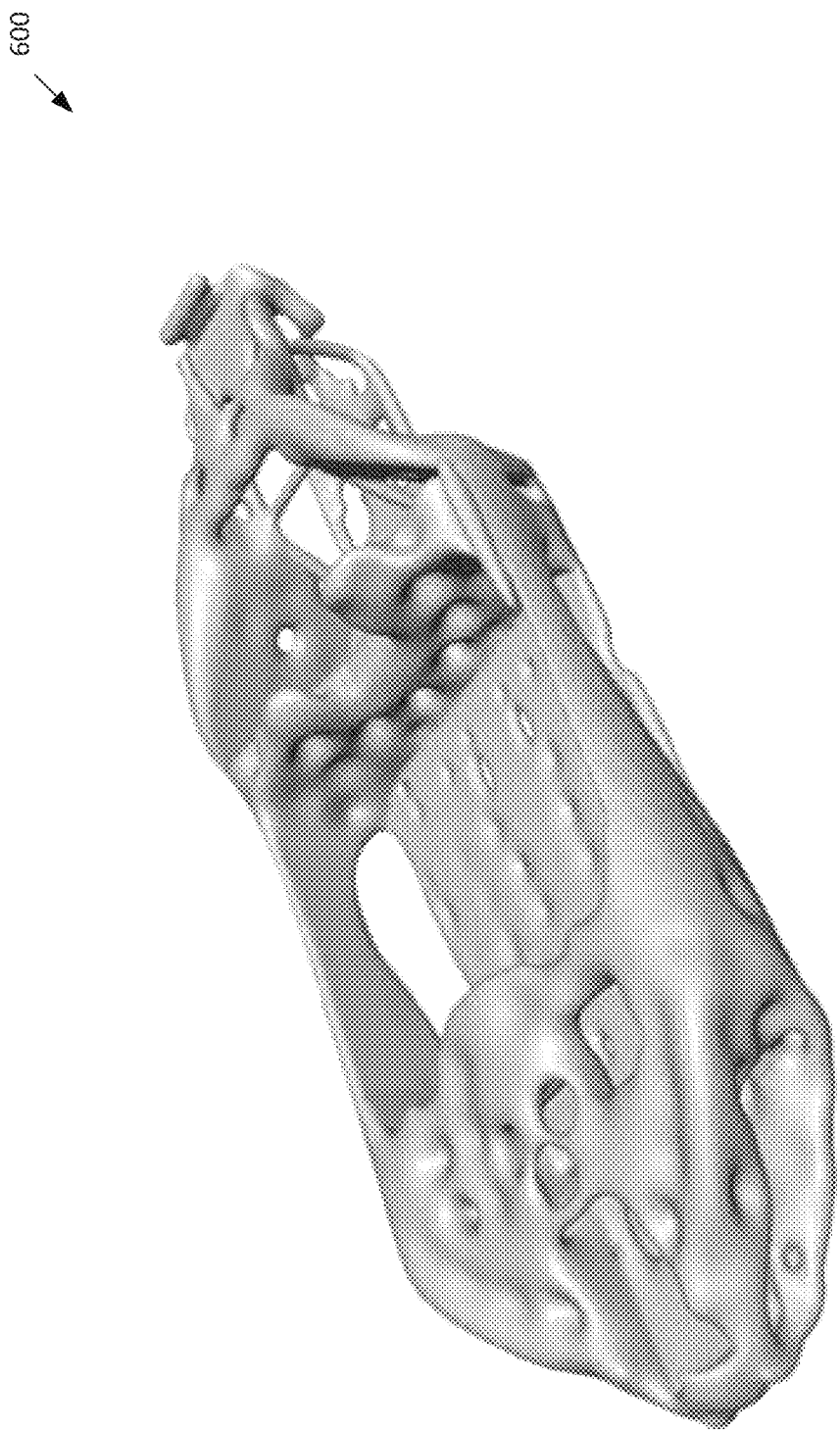
FIG. 6 illustrates a design solution resulting from a topology optimization based on the problem statement of FIG. 5, according to various embodiments of the present invention.
Figure 7:
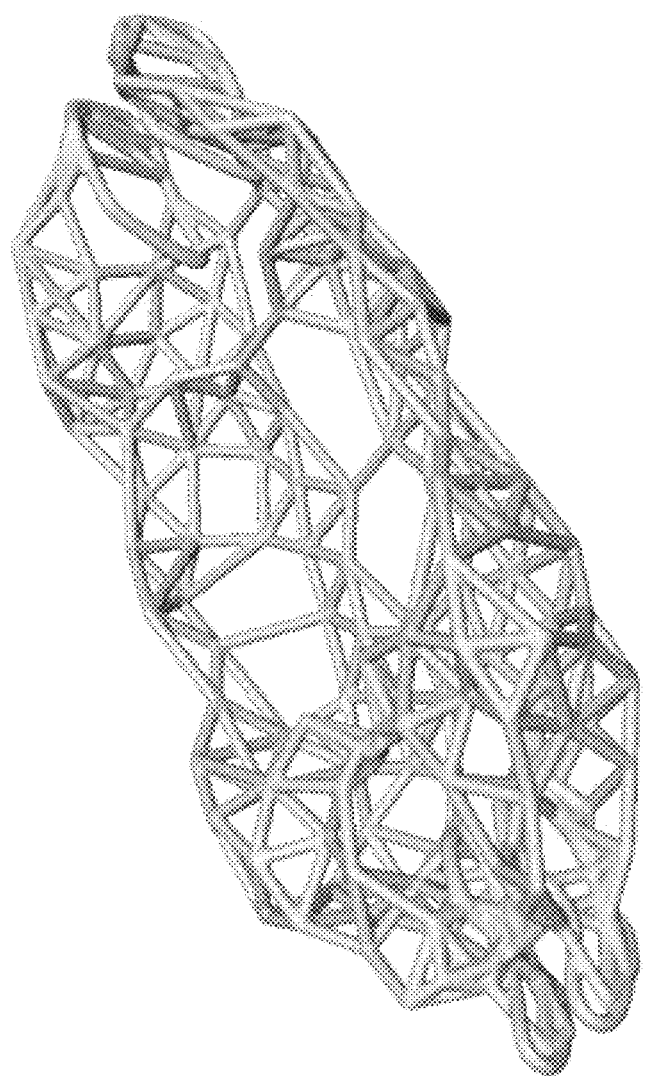
FIG. 7 illustrates a design solution resulting from an initial beam-based optimization of the design solution of FIG. 6, according to various embodiments of the present invention.
Figure 8:
FIG. 8 illustrates a design solution resulting from a final beam-based optimization of the design solution of FIG. 7, according to various embodiments of the present invention.

FIGS. 6-8 show examples of different stages of a design synthesis algorithm comprising the combination of topology optimization and beam-based optimization algorithms. FIG. 6 shows a design solution 600 resulting from topology optimization based on the problem statement 118 of FIG. 5, according to various embodiments of the present invention. In the example of FIG. 6, the number of topology optimization iterations n is equal to 52. FIG. 7 shows a design solution 700 resulting from initial beam-based optimization of the design solution 600 of FIG. 6, according to various embodiments of the present invention. In the example of FIG. 7, the design solution 700 comprises an initialized beam network having beam thicknesses that are equal and consistent in beam thickness. FIG. 8 shows a design solution 800 resulting from final beam-based optimization of the design solution 700 of FIG. 7, according to various embodiments of the present invention. In the example of FIG. 8, the design solution 800 comprises a finalized beam network having optimized beam thicknesses that are not equal and vary in beam thickness. Optimizing the beam thicknesses with variable beam thicknesses may significantly reduce the weight of the resulting fabricated product.

Typically, the design engine 120 produces a plurality of design solutions 122 for a product based on the design problem statement 118, each design solution 122 comprising a 3D model that is a 3D printable design of the product. One design solution 122 may be selected by the designer for fabrication/manufacture and the design engine 120 may export the selected design solution 122 to the fabrication device 160. The fabrication device 160 then fabricates a new physical product based on the selected design solution 122. For example, the fabrication device 160 may fabricate a new car chassis based on the selected design solution 122. The resulting fabricated new car chassis showed that the designs solutions generated from usage feedback were up to 28% lighter in weight than the initial car chassis.

The new physical product then forms part of the input for the next design synthesis iteration. Sensors 210 may then be installed onto the new physical product to form a new physical product with sensors 108 and the iterative design process may be performed again. The iterative design process may be performed multiple times until a satisfactory physical product is achieved.

Figure 9:
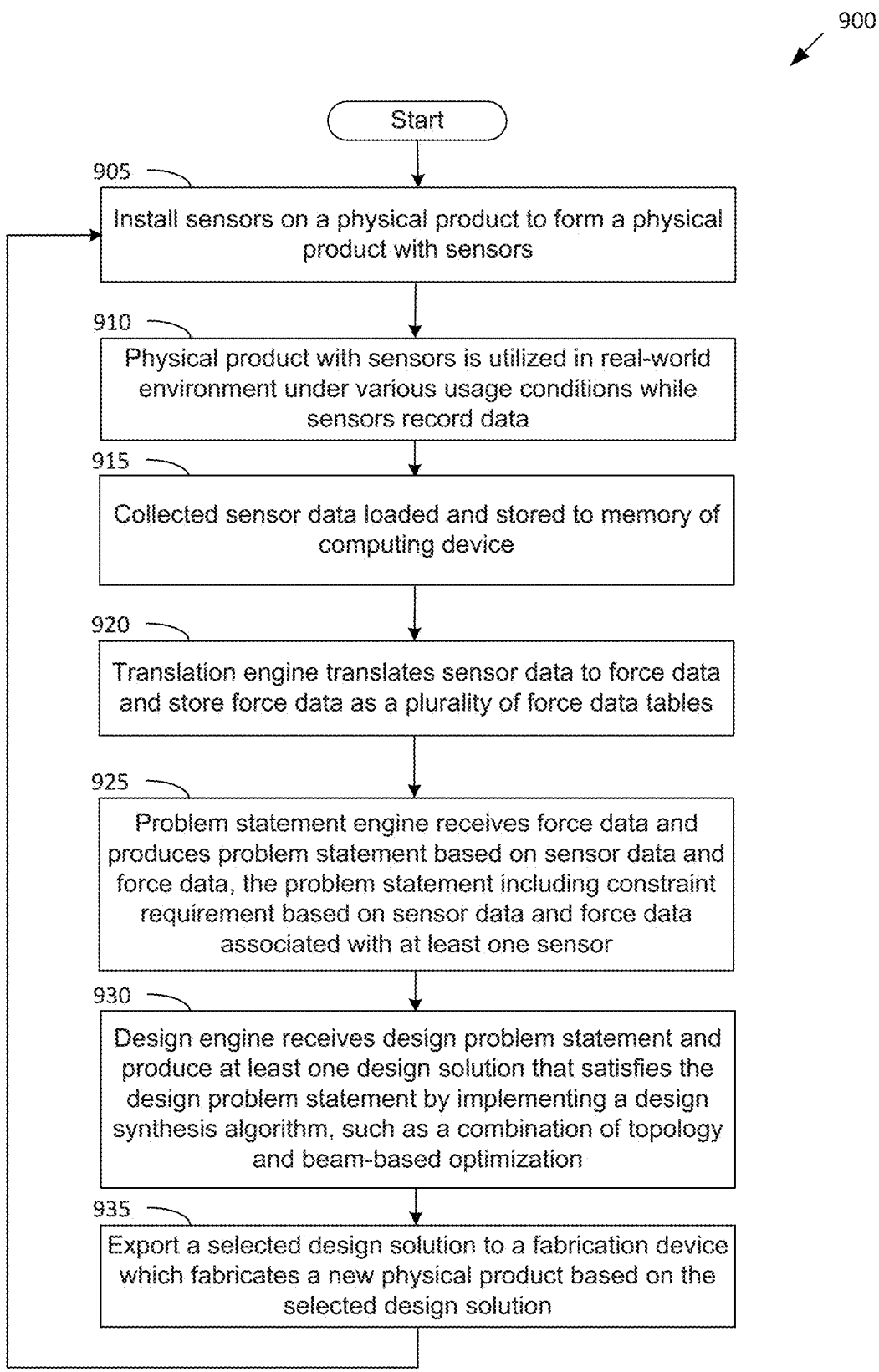
FIG. 9 illustrates a flow diagram of method steps for an iterative design process, according to various embodiments of the present invention.

FIG. 9 illustrates a flow diagram of method steps for an iterative design process, according to various embodiments of the present invention. Although the method steps are described in conjunction with the systems of FIGS. 1-8, persons skilled in the art will understand that any system configured to perform the method steps, in any order, is within the scope of the invention. In some embodiments, the method 900 may be performed when the translation engine 112, design problem statement engine 116, and design engine 120 are executed by the processor 102.

As shown, the method 900 begins by installing (at step 905) sensors 210 on a physical product 200 to form a physical product with sensors 108. The sensors 210 may be placed at one or more locations on the product 200 where data is to be collected, such as port or non-port locations. The sensors 210 may comprise sensors of one or more different types and record/collect one or more different types of data. Further, each sensor 210 may record static data and/or dynamic data. The physical product with sensors 108 is then utilized (at step 910) in a real-world environment under various usage conditions while the sensors 210 record and store data to a storage device 220 mounted on the physical product. Each usage condition may define a specific "load case" for the product 200. For example, for a car chassis, an operational car is driven under different driving maneuvers, each maneuver comprising a different load case for the chassis.

The collected sensor data 110 is then loaded from the storage device 220 and stored (at step 915) to a memory 106 of the computing device 101 for processing. A translation engine 112 then translates (at step 920) the collected sensor data 110 to a type of data compatible with the design problem statement engine 116, such as force data 114. The force data 114 represents various real-world forces or loads being applied to the product 200 under the real-world usage conditions. The resulting force data 114 may comprise static force data and/or dynamic force data. The translation engine 112 may organize and store the translated force data 114 as a plurality of force data tables 300, each force data table 300 storing force data 114 for a specific real-world usage condition ("load case").

The problem statement engine 116 receives (at step 925) the force data 114 as input and produces a design problem statement 118 based, at least in part, on the force data 114. Note that since the force data 114 is derived from the sensor data 110, the problem statement engine 116 in effect produces a problem statement 118 based, at least in part, on the collected sensor data 110. The design problem statement 118 comprises a set of design requirements and a definition of a design space that each design solution for the product must satisfy. The set of design requirements includes at least constraint requirement based, at least in part, on the force data 114 associated with at least one sensor 210 at a mounting location of the at least one sensor 210 on the product 200. Since the force data 114 is derived from the sensor data 110, the problem statement engine 116 in effect produces at least one constraint based, at least in part, on the sensor data 110 collected by the at least one sensor 210. The design problem statement 118 may comprise a separate constraint for each entry 301 of each force data table 300. To produce the constraints of the problem statement 118, the problem statement engine 116 may determine mount locations and geometries for the sensors 210, for example, by producing a 3D scan of the product 200 and subdividing the 3D scan to extract 3D mesh geometries of the sensor mounting locations on the product 200.

The design engine 120 then receives (at step 930) the design problem statement 118 and produce at least one design solution that meets all the design requirements (including all constraints) of the problem statement 118. The design engine 120 may implement various design synthesis algorithms to produce the design solutions. In some embodiments, the design synthesis algorithm comprises a combination of a topology optimization algorithm and a beam-based optimization algorithm. In other embodiments, the design synthesis algorithm comprises another type of design synthesis algorithm.

One of the design solutions 122 is then selected and exported (at step 935) to a fabrication device 160, which fabricates a new physical product based on the selected design solution 122. The method 900 then repeats and continues at step 905 whereby sensors 210 are installed on the new physical product 200 to form a new physical product with sensors 108. The iterative design process 900 may be performed multiple times until a satisfactory physical product is achieved.

As described above, the iterative design process 900 may begin (at step 905) with an initial physical product comprising a previously fabricated product. In other embodiments, however, the iterative design process may begin at step 925, with the formation of the design problem statement 118 by the problem statement engine 116. In these embodiments, the problem statement engine 116 may receive force information from a designer, rather than the translation engine 112. Such force information would not be based on sensor data 110, but rather be based on intuition and previous experience of the designer, and may comprise a "best guess" of the force information. The problem statement engine 116 may then produce a design problem statement 118 based on the received force information from the designer to start the iterative design process 900.

In sum, an iterative design environment performs an iterative design process of a product by implementing usage feedback of the product when utilized in a real-world environment. The iterative design environment enables a physical product to be instrumented with sensors that collect data about the behavior of the product under real-world usage conditions. The data collected by the sensors (usage feedback) comprise recorded real-world quantitative data that is implemented to inform and produce a design problem statement and one or more design solutions. In particular, the sensor data (usage feedback) is translated to force-based data and received by the problem statement engine. The problem statement engine then produces a problem statement based, at least in part, on the force-based data. Since the force-based data is derived from the sensor data, the problem statement engine in effect produces a problem statement based, at least in part, on the collected sensor data. The design engine then produces one or more design solutions for the problem statement and one of the design solutions is fabricated to produce a new physical product. The iterative design process may be performed multiple times until a satisfactory physical product is achieved.

At least one advantage of the disclosed technique is that quantitative usage feedback collected from real-world use of a product are incorporated into an iterative design process for the product. Another advantage of the disclosed technique is that the iterative design process provides design solutions that improve over each iteration based on the usage feedback.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," "engine," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for designing a product, the method comprising:
receiving first sensor data recorded by at least one sensor coupled to a first product when the first product is utilized under a plurality of different conditions, wherein each condition comprises a predetermined controlled load case for the first product that is executed in a real-world use environment;
performing a laser geometry scan of the first product to produce a scan of the first product that includes a mount location for the at least one sensor on the first product;
processing the first sensor data to generate derived data;
generating a first design problem statement based, at least in part, on the first sensor data and the derived data, wherein the first design problem statement specifies the mount location of the at least one sensor on the first product; and
generating at least one design solution based on the first design problem statement.

2. The computer-implemented method of claim 1, further comprising exporting the at least one design solution to a fabrication device for fabricating a second product.

3. The computer-implemented method of claim 2, further comprising:
recording second sensor data while the second product is utilized under at least one condition.

4. The computer-implemented method of claim 3, further comprising:
receiving the second sensor data;
generating a second design problem statement based, at least in part, on the second sensor data; and
generating at least one design solution based on the second design problem statement.

5. The computer-implemented method of claim 1, wherein the at least one sensor is mounted on the first product at a port interface where the first product connects to an external component.

6. The computer-implemented method of claim 1, wherein the first design problem statement comprises at least one constraint requirement based, at least in part, on the first sensor data recorded by the at least one sensor.

7. The computer-implemented method of claim 6, wherein:
the at least one design solution satisfies the at least one constraint requirement.

8. The computer-implemented method of claim 1, wherein:
the first design problem statement comprises a first constraint requirement that specifies a first value at a first mount location;
the first value is derived from the first sensor data recorded by the at least one sensor;
the first mount location specifies the mount location of the at least one sensor on the first product; and the at least one design solution satisfies the first constraint requirement by satisfying the first value at the first mount location.

9. The computer-implemented method of claim 8, wherein the first value comprises a force value.

10. The computer-implemented method of claim 1, wherein the derived data is stored to a plurality of separate data tables, wherein each separate data table stores derived data for a condition in the plurality of different conditions.

11. The computer-implemented method of claim 1, wherein the derived data comprises force data that is stored to a plurality of force data tables, wherein each force data table stores force data for a predetermined controlled load case for the first product.

12. One or more non-transitory computer-readable media storing program instructions that, when executed by one or more processors, cause the one or more processors to design a product by performing the steps of:
  receiving first sensor data recorded by at least one sensor coupled to a first product when the first product is utilized under a plurality of different conditions, wherein each condition comprises a predetermined controlled load case for the first product that is executed in a real-world use environment;
  performing a laser geometry scan of the first product to produce a scan of the first product that includes a mount location for the at least one sensor on the first product;
  processing the first sensor data to generate derived data;
  generating a first design problem statement based, at least in part, on the first sensor data and the derived data, wherein the first design problem statement specifies the mount location of the at least one sensor on the first product; and
  generating at least one design solution based on the first design problem statement.

13. The one or more non-transitory computer-readable media of claim 12, further comprising exporting the at least one design solution to a fabrication device for fabricating a second product.

14. The one or more non-transitory computer-readable media of claim 13, further comprising:
  recording second sensor data while the second product is utilized under at least one condition.

15. The one or more non-transitory computer-readable media of claim 14, further comprising:
  receiving the second sensor data;
  generating a second design problem statement based, at least in part, on the second sensor data; and
  generating at least one design solution based on the second design problem statement.

16. The one or more non-transitory computer-readable media of claim 12, wherein the at least one sensor is mounted on the first product at a port interface where the first product connects to an external component.

17. The one or more non-transitory computer-readable media of claim 12, wherein the first design problem statement comprises at least one constraint requirement based, at least in part, on the first sensor data recorded by the at least one sensor.

18. A computer-implemented method for designing a product, the method comprising:
  receiving first sensor data recorded by at least one sensor on a first product when utilized in a plurality of different conditions, wherein each condition comprises a predetermined controlled load case for the first product that is executed in a real-world use environment;
  performing a laser geometry scan of the first product to produce a scan of the first product that includes a mount location for the at least one sensor on the first product;
  processing the first sensor data to generate first force data;
  generating a first design problem statement based, at least in part, on the first force data, wherein the first design problem statement specifies the mount location of the at least one sensor on the first product; and
  generating at least one design solution based on the first design problem statement.

19. The computer-implemented method of claim 18, further comprising:
  exporting the at least one design solution to a fabrication device for fabricating a second product;
  installing at least one sensor on the second product; and
  recording, at the at least one sensor, second sensor data while the second product is utilized in at least one condition;
  translating the second sensor data to second force data;
  producing a second design problem statement based, at least in part, on the second force data; and
  producing at least one design solution based on the second design problem statement.

20. The computer-implemented method of claim 18, wherein producing the at least one design solution comprises applying a combination of topology optimization and beam-based optimization design synthesis algorithms to the design problem statement.

21. The computer-implemented method of claim 18, wherein:
  the first design problem statement comprises a plurality of constraint requirements; and
  the at least one design solution satisfies each constraint requirement specified in the first design problem statement.

22. The computer-implemented method of claim 18, wherein:
  the first sensor data comprises a plurality of different types of data; and
  the first sensor data comprises at least one of static data or dynamic data.

23. The computer-implemented method of claim 18, further comprising:
  storing the first force data as a plurality of force data tables, each force data table storing force data for a specific condition.

* * * * *